(12) United States Patent
Tanaka

(10) Patent No.: US 7,034,864 B2
(45) Date of Patent: Apr. 25, 2006

(54) IMAGE DISPLAY APPARATUS, IMAGE DISPLAY SYSTEM, AND IMAGE DISPLAY METHOD

(75) Inventor: Koichiro Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 668 days.

(21) Appl. No.: 09/861,128

(22) Filed: May 18, 2001

(65) Prior Publication Data

US 2002/0051080 A1    May 2, 2002

(30) Foreign Application Priority Data

May 19, 2000  (JP)  ............................. 2000-148887
May 19, 2000  (JP)  ............................. 2000-148888
May 14, 2001  (JP)  ............................. 2001-143661

(51) Int. Cl.
*H04N 5/225* (2006.01)
*H04N 5/232* (2006.01)
*H04N 5/76* (2006.01)

(52) U.S. Cl. ............................. 348/207.11; 348/211.99; 348/333.02; 348/231.2

(58) Field of Classification Search ................ 348/552, 348/143, 207.99, 207.1, 207.11, 211.99, 211.1, 348/211.3, 211.5, 211.6, 211.8, 211.11, 211.12, 348/211.14, 333.02, 231.2, 231.3, 231.9; 709/203, 204, 208, 209, 217; 345/501, 502, 345/629; 715/733, 523, 513, 517
See application file for complete search history.

(56) References Cited

U.S. PATENT DOCUMENTS

| | | | |
|---|---|---|---|
| 6,404,445 B1 * | 6/2002 | Galea et al. ................ 709/203 |
| 6,654,060 B1 * | 11/2003 | Kurosawa et al. .......... 348/143 |
| 6,891,566 B1 * | 5/2005 | Marchese ................ 348/211.3 |
| 2002/0138847 A1 * | 9/2002 | Abrams et al. ............. 348/143 |
| 2003/0204814 A1 * | 10/2003 | Elo et al. ..................... 715/513 |

* cited by examiner

*Primary Examiner*—Aung Moe
(74) *Attorney, Agent, or Firm*—Morgan & Finnegan, LLP

(57) ABSTRACT

In an image display system which has a management station for saving, in a server, management data that contains at least names, identification numbers, and connection numbers of image sensing devices, and is described in the data description language, and the display style of the management data, and a display device, and which displays a video obtained from an arbitrary one or more image sensing devices connected, the management data of the image sensing devices is read out from the server, the display style of the readout management data is read out from the server, and an image is generated and displayed by applying the management data to the display style.

25 Claims, 16 Drawing Sheets

FIG. 11
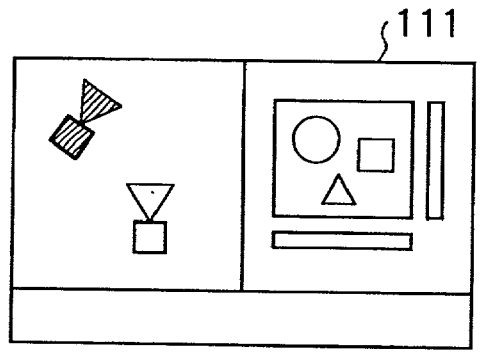
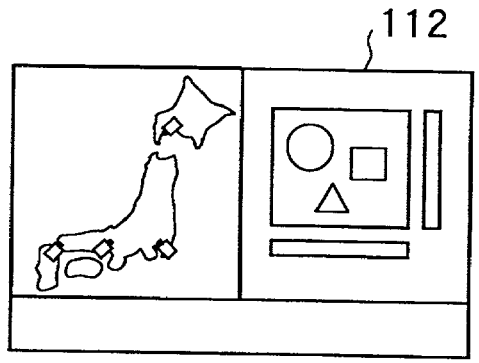
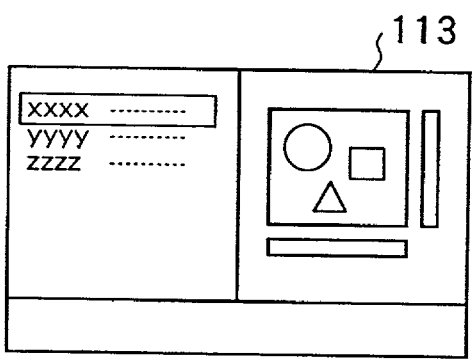
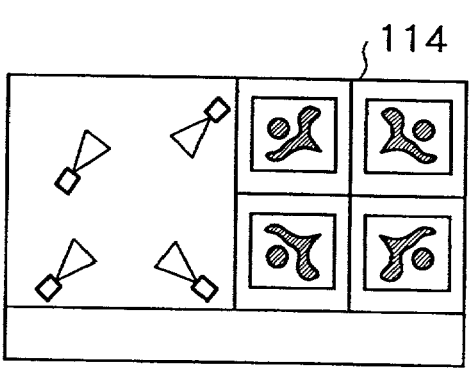
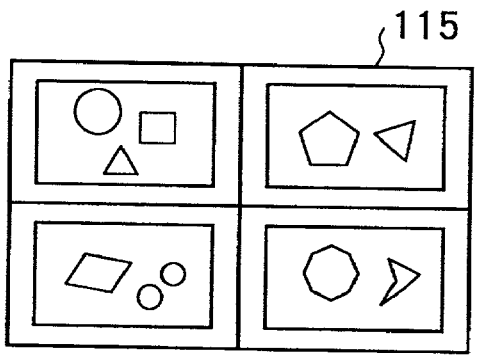
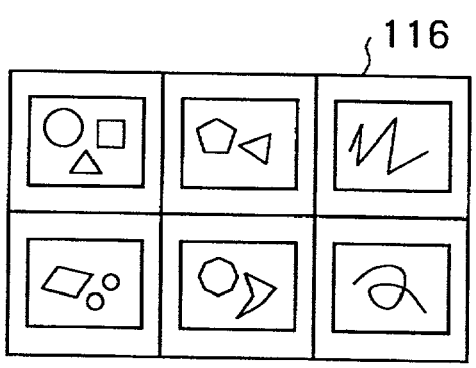
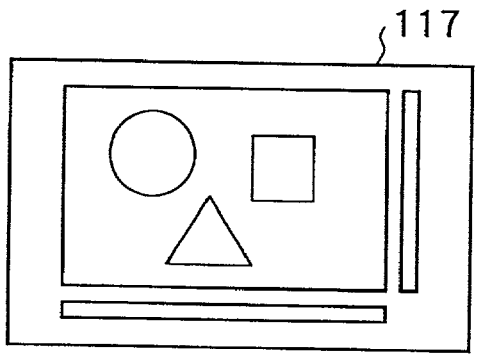
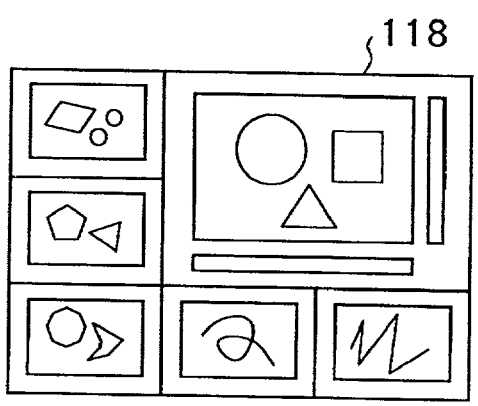

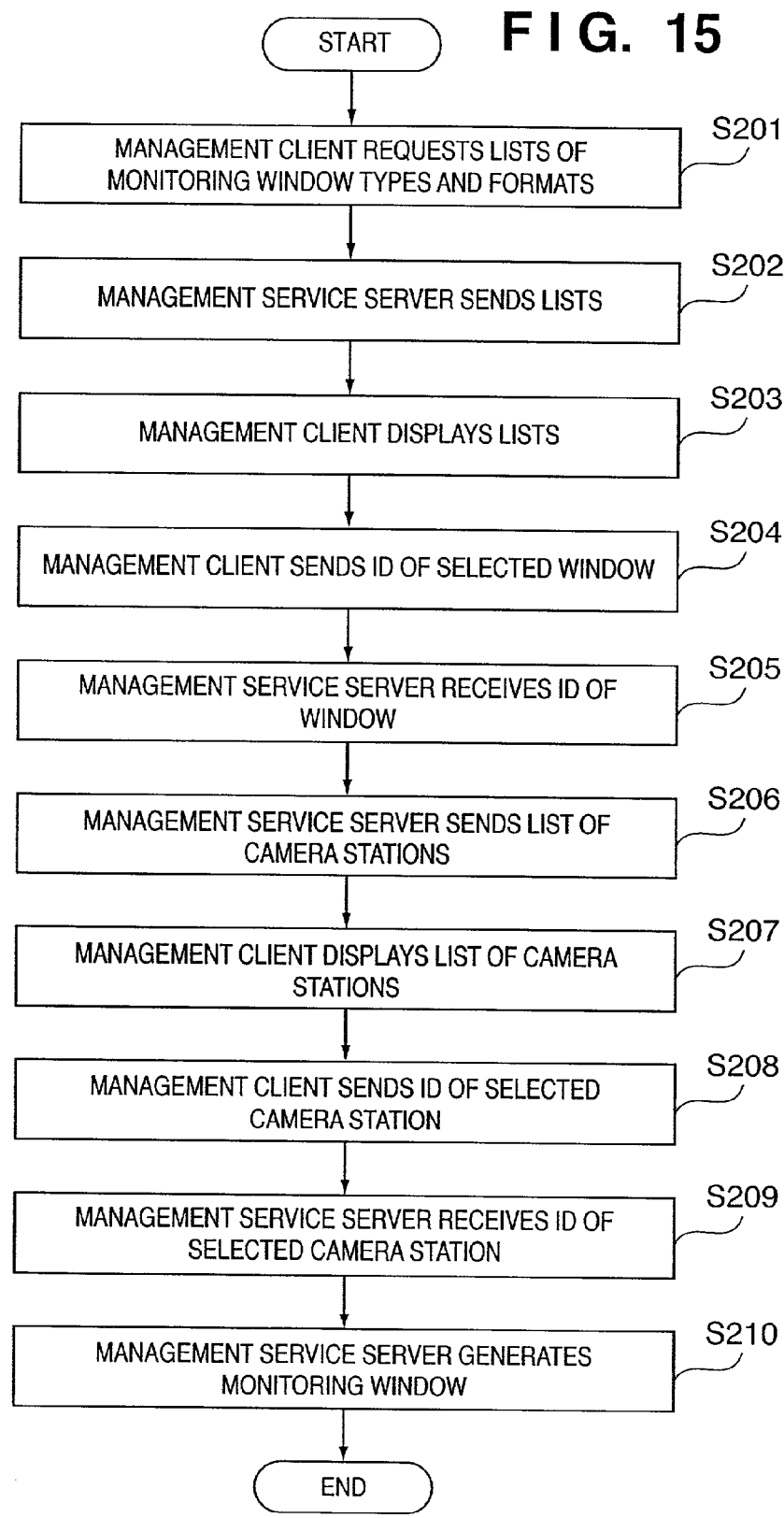

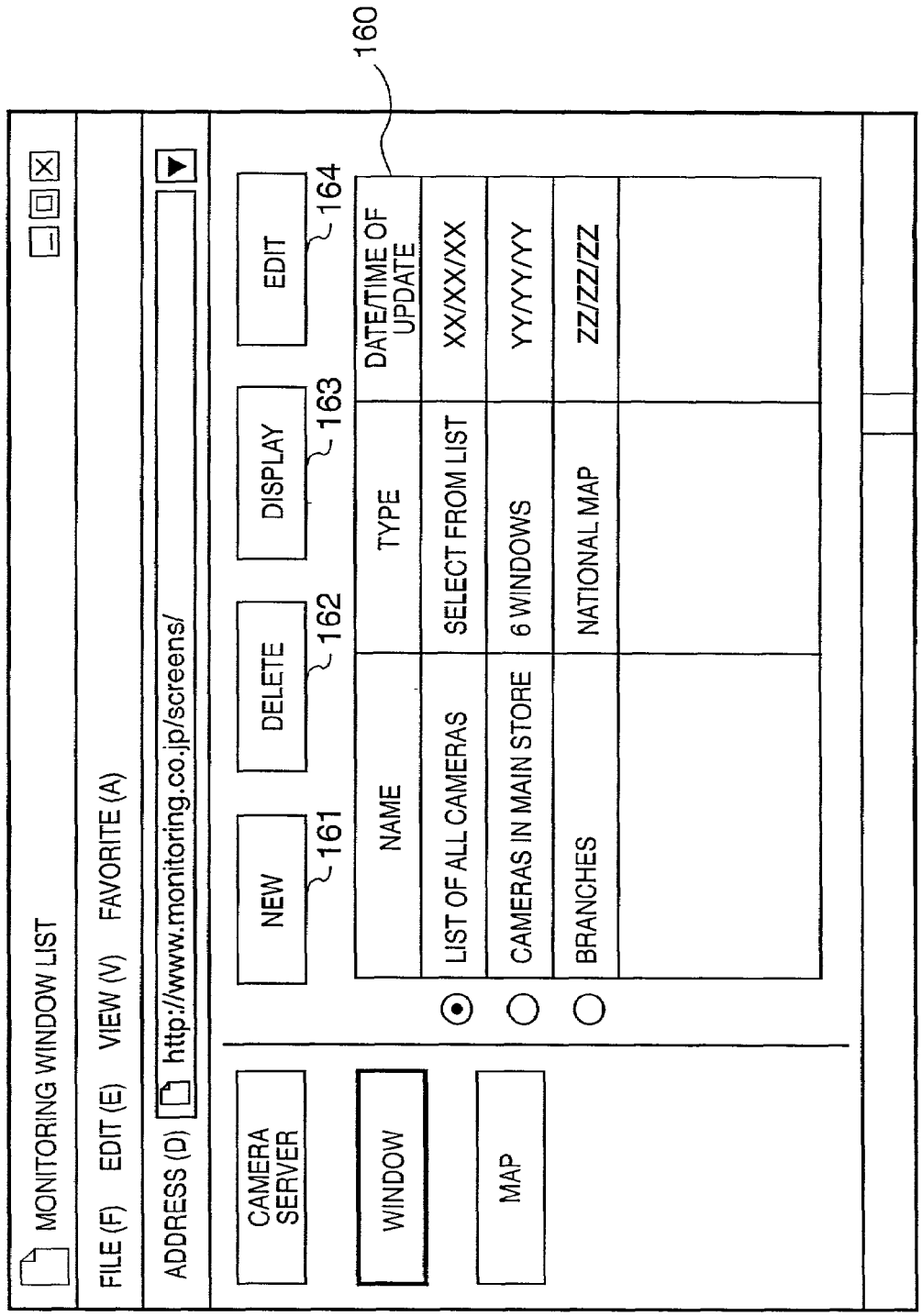

IMAGE DISPLAY APPARATUS, IMAGE DISPLAY SYSTEM, AND IMAGE DISPLAY METHOD

FIELD OF THE INVENTION

The present invention relates to an image display apparatus, image display system, and image display method for selecting an arbitrary one of a plurality of cameras connected, and displaying an image captured by the selected camera.

BACKGROUND OF THE INVENTION

A monitor system using video cameras requires an optimal monitor terminal layout depending on the purpose intended and the number of cameras.

In a conventional monitor system of this type, since analog video signals from cameras are directly displayed on video monitors, videos are determined by the physical layout of monitors. The layout of a control panel used to make various operations for cameras is determined by the physical layout of switches upon manufacture.

In recent years, in a monitor system that exploits a GUI (graphical user interface) of a computer, a control panel and video monitors are graphically displayed on the computer screen, and are operated using a pointing device such as a mouse or the like. For this reason, the window configuration such as the video display style, control panel layout, and the like can be changed by modifying programs and scripts.

However, in such conventional image display apparatus, since an expert programmer must modify programs, scripts, or page description to change the window configuration, end users cannot easily modify the window configuration.

For this reason, upon introducing a monitor system having a window configuration suitable for the purpose intended, high cost is required to hire an expert programmer for programming.

SUMMARY OF THE INVENTION

The present invention has been made in consideration of the above situation, and has as its object to provide an image display apparatus, image display system, and image display method, which allow an end user to easily change the window configuration, and can realize with low cost the window configuration suited to the purpose intended.

According to the present invention, the foregoing object is attained by providing an image display apparatus for selecting an arbitrary image sensing device from one or more image sensing devices connected, and displaying a video obtained from the selected image sensing device, comprising first memory for holding management data which contains at least a name, identification number, and connection information of each image sensing device, and is described in a data description language; second memory for holding a display style of the management data, which is described in a style designation language; and data description means for describing management data in the data description language, and storing the data in the first memory.

According to the present invention, the foregoing object is also attained by providing an image display system comprising one or more image sensing devices; first memory for holding management data which contains at least a name, identification number, and connection number of each image sensing device, and is described in a data description language; second memory for holding a display style of the management data, which is described in a style designation language; data description means for describing management data in the data description language, and storing the data in the first memory; means for reading out the management data from the first memory; means for reading out the display style from the second memory; and a data display unit for displaying by applying the readout management data to the readout display style.

Further, the foregoing object is also attained by providing the apparatus, wherein a function of the image sensing device includes at least one of a pan angle, tilt angle, zoom ratio, and image quality, and can be controlled, and the display style of the management data includes a style of an operation display for controlling the function.

Furthermore, the foregoing object is also attained by providing an image display method for selecting an arbitrary image sensing device from one or more image sensing devices connected, and displaying a video obtained from the selected image sensing device, comprising the window configuration step of presenting inquiries in turn, determining a configuration of an image display window suitable for a purpose intended on the basis of answers to the inquiries, and outputting window configuration information; and the window generation step of generating a display window on the basis of the window configuration information.

Further, the foregoing object is also attained by providing an image display apparatus for selecting an arbitrary image sensing device from one or more image sensing devices connected, and displaying a video obtained from the selected image sensing device, comprising window configuration means for presenting inquiries in turn, determining a configuration of an image display window suitable for a purpose intended on the basis of answers to the inquiries, and outputting window configuration information; and window generation means for generating a display window on the basis of the window configuration information.

Further, the foregoing object is also attained by providing a window configuration method for configuring a window for displaying a video obtained from an arbitrary image sensing device out of image sensing devices connected, comprising the steps of outputting a window pattern list to an external device; outputting a list of the image sensing devices connected, to the external device; receiving information indicating a window pattern selected from the window pattern list from the external device; receiving information indicating at least one image sensing device selected from the list of the image sensing devices connected, from the external device; generating an image display window on the basis of the window pattern and the information indicating the image sensing device received from the external device; and storing the generated image display window.

Further, the foregoing object is also attained by providing a window configuration method for configuring a window for displaying a video obtained from an arbitrary image sensing device out of image sensing devices connected, comprising the steps of requesting a window pattern list from an information processing apparatus to a window configuration apparatus; outputting the window pattern list from the window configuration apparatus to the information processing apparatus in response to the request; displaying the window pattern list in the information processing apparatus; selecting a window pattern from the displayed window pattern list; transmitting the selected window pattern from the information processing apparatus to the window configuration apparatus; requesting a list of the image sensing devices connected, from the information processing apparatus to the window configuration apparatus; outputting the list of the image sensing devices connected, from the window configuration apparatus to the information processing apparatus in response to the request; displaying the list of the image sensing devices in the information processing apparatus; selecting at least one image sensing apparatus from the displayed list of the image sensing devices; transmitting information indicating the selected image sensing device from the information processing apparatus to the window configuration apparatus; configuring an image display window on the basis of the transmitted window pattern and information indicating the image sensing device in the window configuration apparatus; and storing the generated image display window in the window configuration apparatus.

Further, the foregoing object is also attained by providing a window configuration apparatus for configuring a window for displaying a video obtained from an arbitrary image sensing device out of image sensing devices connected, comprising first memory for storing a window pattern list; second memory for storing a list of image sensing devices connected; transmission means for outputting the window pattern list and the list of the image sensing devices connected, to an external device; reception means for receiving information indicating a window pattern selected from the window pattern list and information indicating at least one image sensing device selected from the list of the image sensing devices connected, from the external device; window generation means for generating an image display window on the basis of the window pattern and the information indicating the image sensing device received from the external device; and third memory for storing the generated image display window.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 shows an example of choices of basic styles of the monitoring window according to the first embodiment of the present invention;

FIG. 15 is a flow chart showing an example of an operation of the monitoring wizard according to the second embodiment of the present invention; and FIG. 16 is a diagram of an example of a window showing a monitoring window list according to the second embodiment of the present invention.

DETAILED DESCRIPTION OF THE PREFERRED EMBODIMENTS

Preferred embodiments of the present invention will be described in detail in accordance with the accompanying drawings.

First Embodiment

Figure 1:
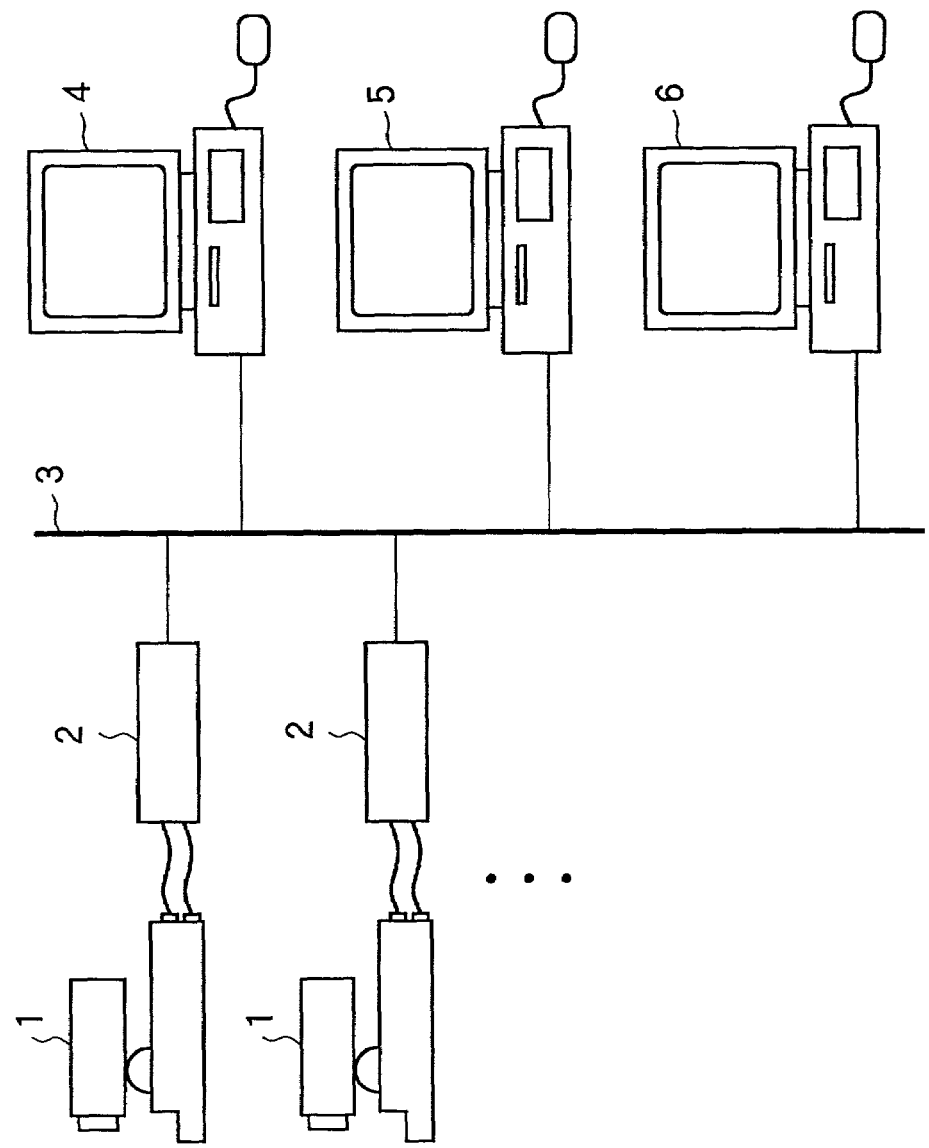
FIG. 1 is a diagram showing an arrangement of a remote monitoring system according to the first embodiment of the present invention.

FIG. 1 is a diagram of a remote monitoring system according to the first embodiment of the present invention.

Reference numeral 1 denotes pan/tilt/zoom-controllable cameras; and 2, network camera adapters each of which converts a video signal input from the corresponding camera 1 into digital data, compresses the digital data by Motion-JPEG, and sends the compressed data onto a network. Also, each network camera adapter 2 controls the corresponding camera 1 via serial communications on the basis of control commands received from the network. Reference numeral 3 denotes a network that transports the Internet protocol. A plurality of sets of cameras 1 and network camera adapters 2 (to be referred to as "camera stations" hereinafter) are connected to the network 3. The cameras 1 and network adapters 2 may include different models.

Each network adapter 2 is preferably compatible to a network device automatic detection protocol such as Universal Plug and Play (UPnP) or the like.

Reference numeral 4 denotes a monitoring station using a personal computer. The monitoring station 4 receives video signals from the network camera adapters 2 via the network 3, and decodes and displays them. The monitoring station 4 sends camera control commands for the pan and tilt angles and the zoom ratio to each network camera adapter 2 in accordance with operations of a mouse, joystick, keyboard, and the like. A plurality of monitoring stations 4 may be also connected to the network 3, although not shown in FIG. 1.

Reference numeral 5 denotes a management station using a personal computer; and 6, a server using a personal computer. The management station 5 manages information such as the names, network addresses, types, and the like of camera stations connected to the network 3, and saves management data in the server 6 in the XML format. Also, the management station 5 designs the monitoring window to be displayed on each monitoring station 4, and saves in the server 6 window style data in the XSL format and video layout data, camera layout (camera map) data, and the like in the XML format. Note that these data configurations will be explained in detail later with reference to FIG. 4.

The server 6 can be either a Web server or file server.

Also, one or any combinations of the monitoring station 4, management station 5, and server 6, or all of them may be realized by a single personal computer.

Figure 2:
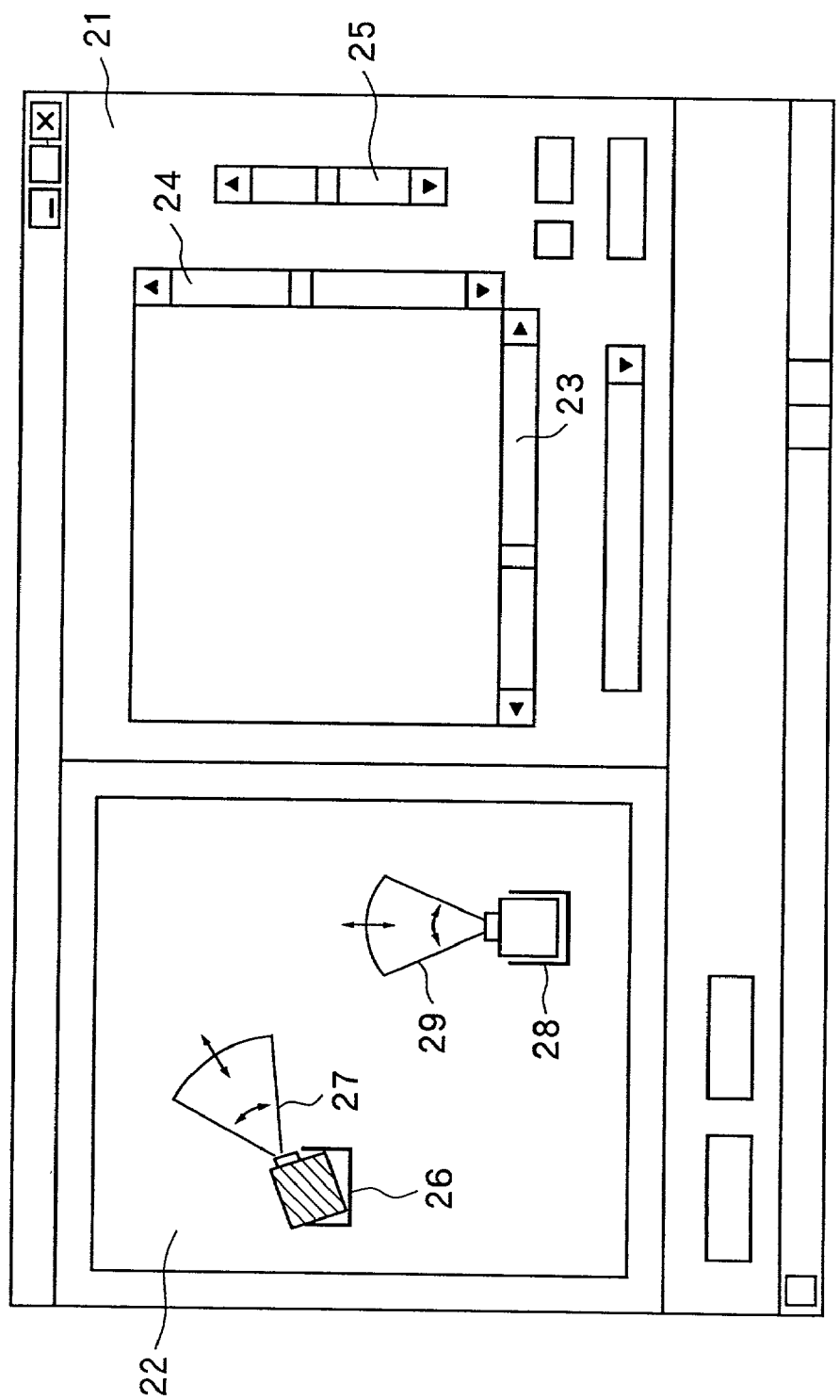
FIG. 2 shows an example of a window (monitoring window) of a monitoring station.

FIG. 2 shows an example of the window (monitoring window) on the monitoring station 4 according to the first embodiment. Reference numeral 21 denotes a video viewer for displaying a video signal from a given camera; 22, a map viewer for displaying a camera map; and 23, 24, and 25, scroll bars respectively used to control the pan angle, tilt angle, and zoom ratio of the camera. Reference numerals 26 and 28 denote camera icons each indicating a given camera on the camera map; and 27 and 29, scope icons respectively indicating the image sensing direction and range of the camera. When a camera is switched by clicking the camera icon 26 or 28, a video signal obtained from a desired camera can be displayed. By operating the scope icon 27, the pan angle, tilt angle, and zoom ratio of the camera can be controlled.

In addition to these operation buttons, operation members for backlight correction, preset selection, snap shot (to instruct to capture a still image), panoramic display, and the like may be provided.

Figure 3:
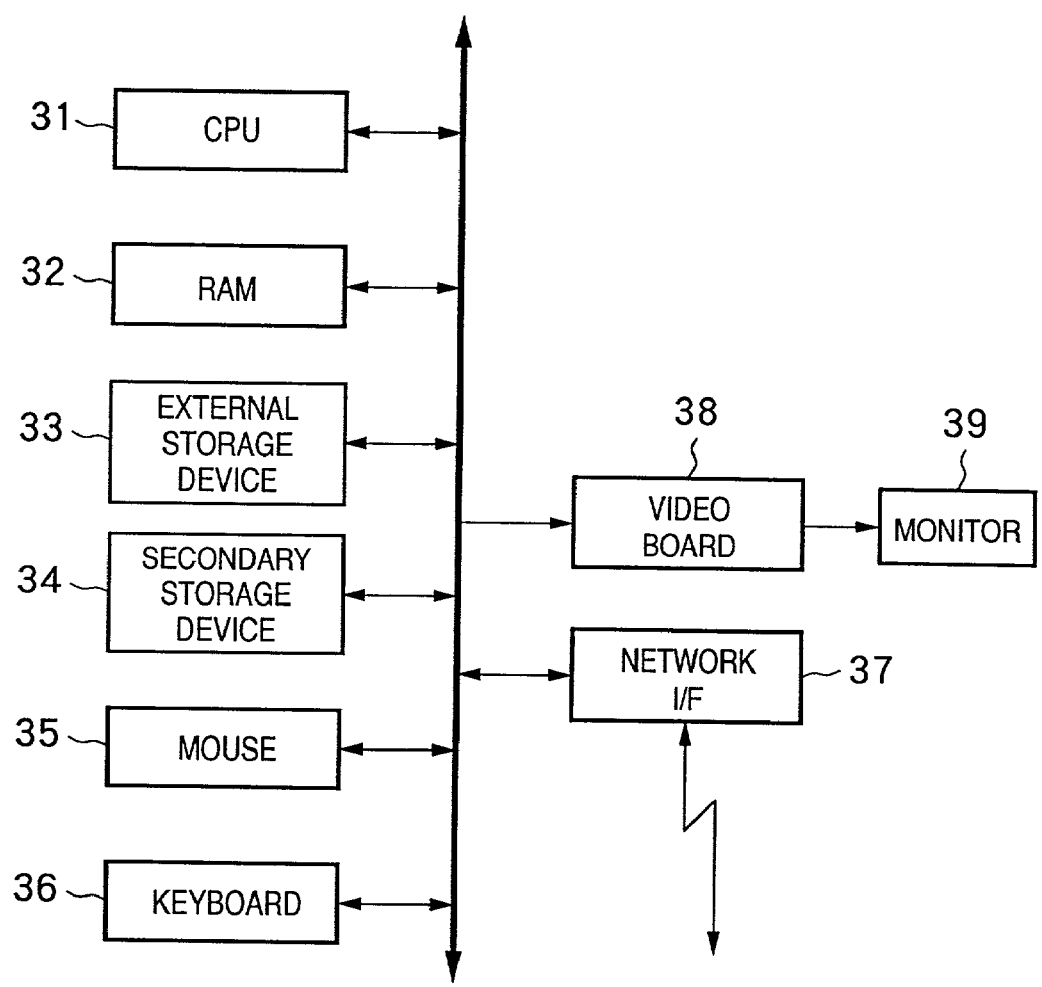
FIG. 3 is a block diagram showing the arrangement of a personal computer.

FIG. 3 is a block diagram showing the arrangement of a general personal computer used as the monitoring station, management station, and server.

Reference numeral 31 denotes a CPU for systematically controlling the entire computer; 32, a main memory (RAM); 33, a removable external storage device such as a floppy disk, CD-ROM, or the like; 34, a secondary storage device such as a hard disk or the like; 35, a mouse serving as a pointing device; 36, a keyboard; 37, a network interface; 38, a video board; and 39, a monitor.

Figure 4:
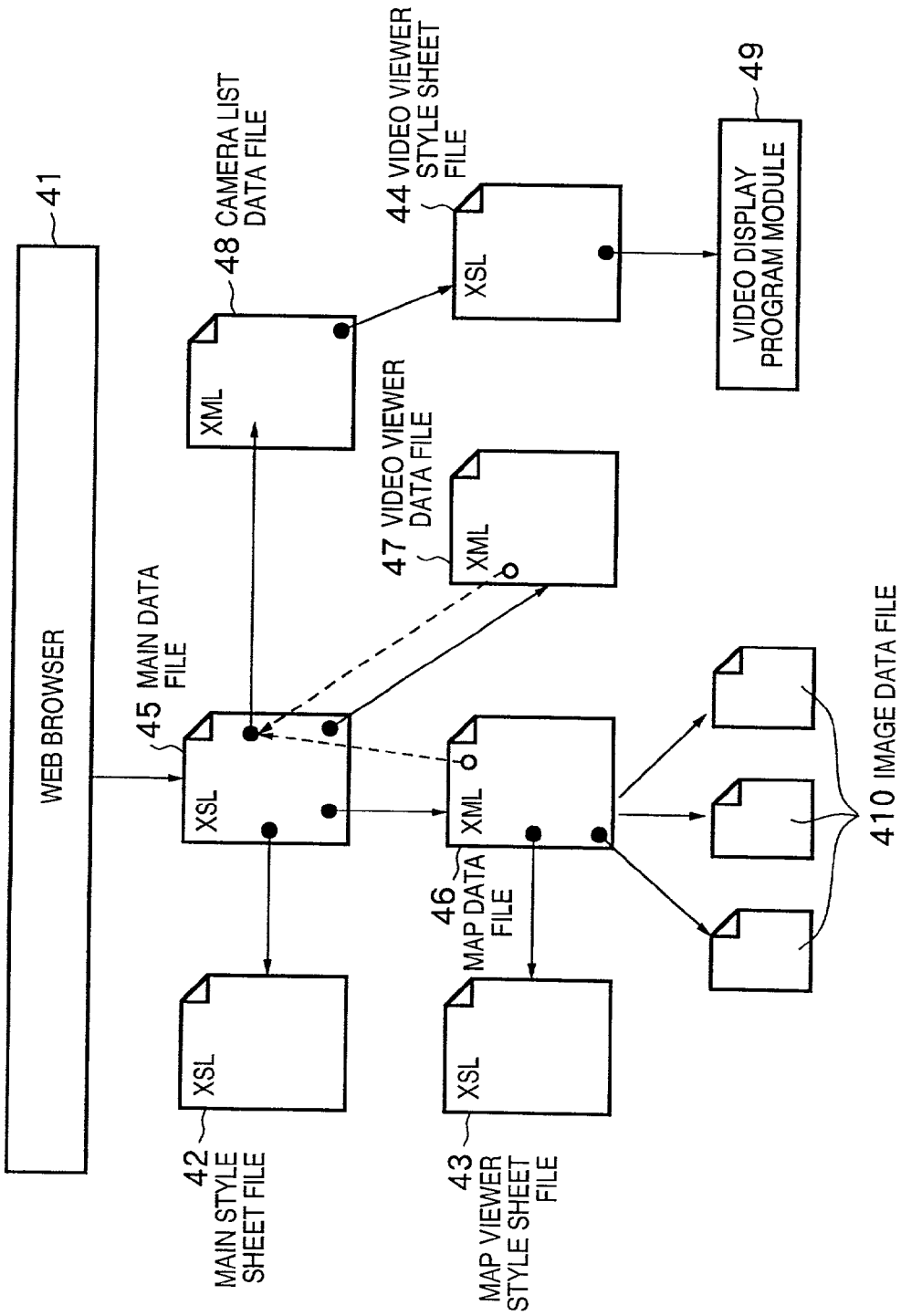
FIG. 4 is a diagram of software programs and data used in the monitoring station according to the first embodiment of the present invention.

FIG. 4 is a diagram of software programs and data used in the monitoring station 4. As described above, data are generated and updated by the management station 5, and are stored in the server 6.

Reference numeral 41 denotes a Web browser which can display a style sheet file described in the style designation language XSL by applying it to a data file described in the data description language XML. The Web browser 41 can execute plug-in programs of Java, ActiveX, and the like, and script programs of ECMAScript.

Reference numeral 42 denotes a main style sheet file that describes the display style and operation responses of the entire monitoring window; 43, a map viewer style sheet file that describes the display style and operation responses of the map viewer 22 in the XSL and ECMAScript formats; and 44, a video viewer style sheet file that describes the display style and operation responses of the video viewer 21. A plurality of kinds of style sheet files are prepared in correspondence with the monitoring purposes and job patterns used.

Reference numeral 45 denotes a main data file that describes display option data of the entire monitoring window; 46, a map data file that describes the camera map data for the map viewer 22; 47, a video viewer data file that describes display option data of the video viewer; and 48, a camera list data file that describes management data and link data of all camera stations.

Reference numeral 49 denotes a video display program module in the ActiveX or Java applet format; and 410, bitmap image data files to be rendered on the camera map.

The main data file 45 designates the main style sheet file 42 as a style in the form of a link. Also, the main data file 45 describes links to the map data file 46 and camera list data file 48 to use them as map data and camera list data, respectively.

The map data file 46 designates the map viewer style sheet file 43 as a style in the form of a link. Also, the map data file 46 describes a reference designation for referring to data of the camera list data file 48, the link to which is designated in the main data file 45.

The camera list data file 48 describes management data of, e.g., the names, network addresses, types, and the like of camera stations for each camera 3 connected to the network 3, and a link to the video viewer style sheet file 44 to be used.

The video viewer style sheet file 44 describes a link to the video display program module 49 to be used.

Figure 5:
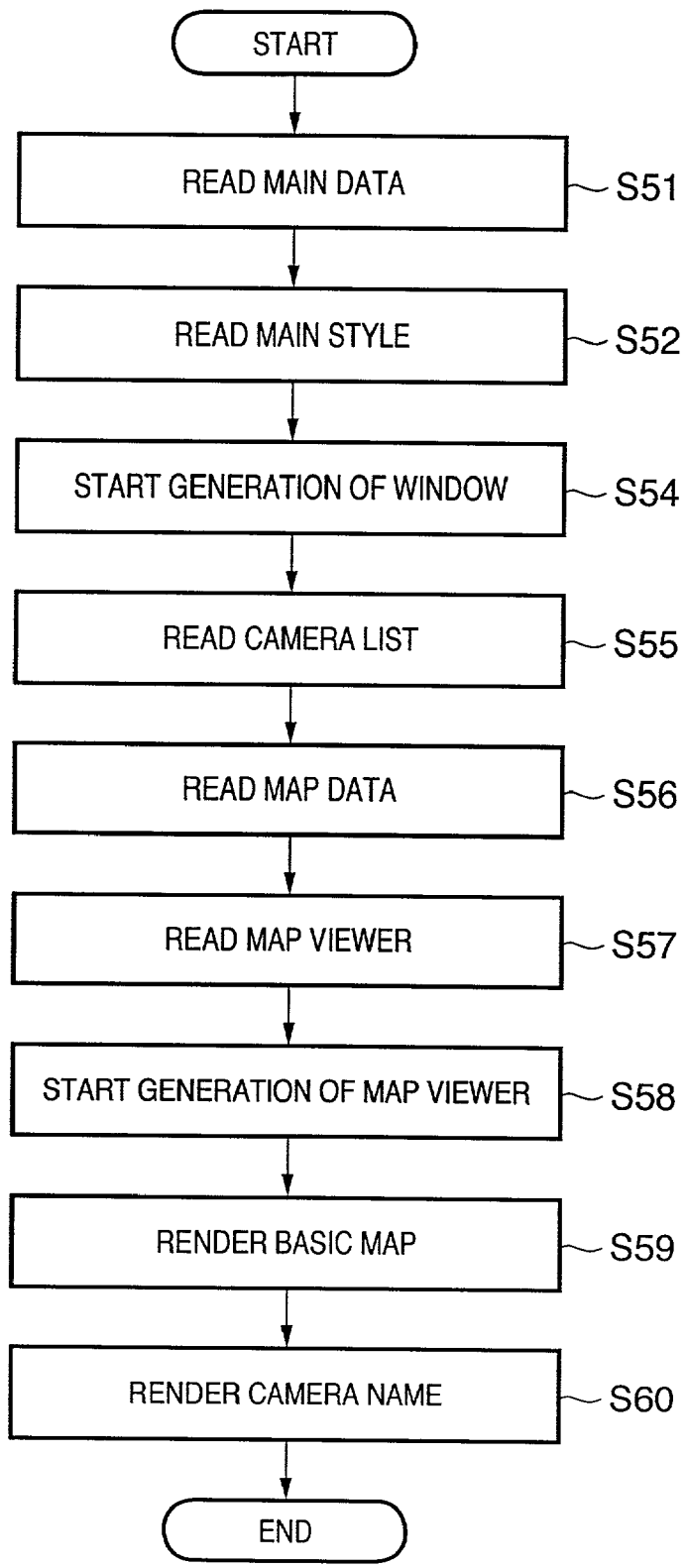
FIG. 5 is a flow chart showing the process of a Web browser upon generating the monitoring window according to the first embodiment of the present invention.

FIG. 5 is a flow chart showing the process of the Web browser 41 upon generating the monitoring window.

The Web browser 41 acquires and reads the main data file 45 from the server 6 (step S51).

The Web browser 41 then acquires and reads the main style sheet file 42 designated by the link as a style from the server 6 (step S52). The Web browser 41 then interprets the main style sheet file 42, and interprets the main data file 45 in accordance with a conversion designation described in the XSL format, thus starting generation of the monitoring window (step S54).

In this generation process, the Web browser 41 acquires and reads the camera list data file 48 designated by the link from the server 6 (step S55).

The Web browser 41 acquires and reads the map data file 46 designated by the link from the server 6 to display it as a camera map (step S56). The Web browser 41 acquires and reads the map viewer style sheet file 43 designated as a style by the link from the server 6 (step S57). The Web browser 41 then interprets the map viewer style sheet file 43, and interprets the map data file 46 in accordance with a conversion designation described in the XSL format, thus starting generation of the map viewer window (step S58).

During this process, the Web browser 41 acquires and reads bitmap files 410 from the server 6 as needed on the basis of a link to a background bitmap file and the display positions of the camera icons described in the map data file 46, and renders a basic map (step S59). The Web browser 41 searches data of the camera list data file 48 for the names or the like of cameras corresponding to camera IDs described in the map data file 46, and displays them on the map (step S60).

Figure 6:
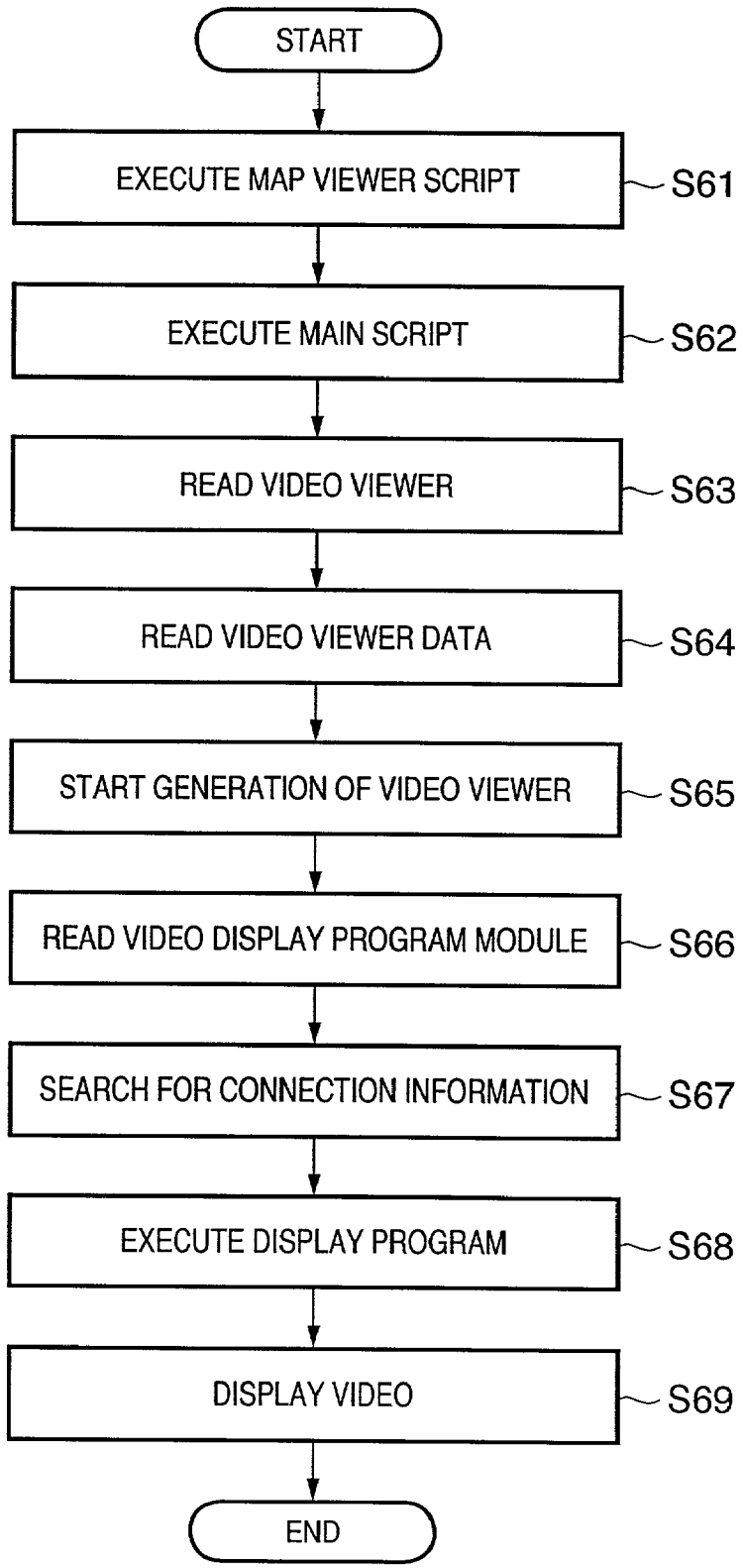
FIG. 6 is a flow chart showing the process of the Web browser upon generating a video viewer according to the first embodiment of the present invention.

FIG. 6 is a flow chart showing the process of the Web browser 41 upon generating the video viewer 21.

When the user has clicked the camera icon 26 or 28 on the map viewer 22 using the mouse, the Web browser 41 executes a script function arithmetic operation of the corresponding camera, which is described in the map viewer style sheet file 43 (step S61). Furthermore, the Web browser 41 executes a script function arithmetic operation described in the main style sheet file 42 (step S62).

During this process, the Web browser 41 searches data of the camera list data file 48 for a link to the video viewer style sheet file 44 suitable for the camera corresponding to the camera ID of the clicked camera icon, and acquires and reads that video viewer style sheet file 44 from the server 6 (step S63). The Web browser 41 then acquires and reads the video viewer data file 47 from the server 6 (step S64). The Web browser 41 then interprets the video viewer style sheet file 44, and interprets the video viewer data file 47 in accordance with a conversion designation described in the XSL format, thus starting generation of the viewer window (step S65).

The Web browser 41 then acquires and reads the video display program module 49 in accordance with the link described in the video viewer style sheet file 44 (step S66) The Web browser 41 searches data of the camera list data file 48 for connection information such as a TCP/IP address or the like corresponding to the camera ID of the camera to be displayed (step S67). The Web browser 41 designates the found connection information to start execution of the video display program module (step S68). In this process, the video display program module connects the corresponding camera station by TCP/IP, and acquires and displays a video signal from the camera (step S69).

As described above, in the first embodiment, the Web browser 41 dynamically generates and displays the monitoring window on the basis of various style sheet files and data files stored in the server 6 or in accordance with operations.

For this reason, when a style sheet file is replaced by another one, the display style of the monitoring window can be changed. Also, by changing data files, the monitoring window having a given display style can be generated for different camera layouts and arrangements.

The data generation/update process in the management station 5 shown in FIG. 4 will be explained below.

Figure 7:
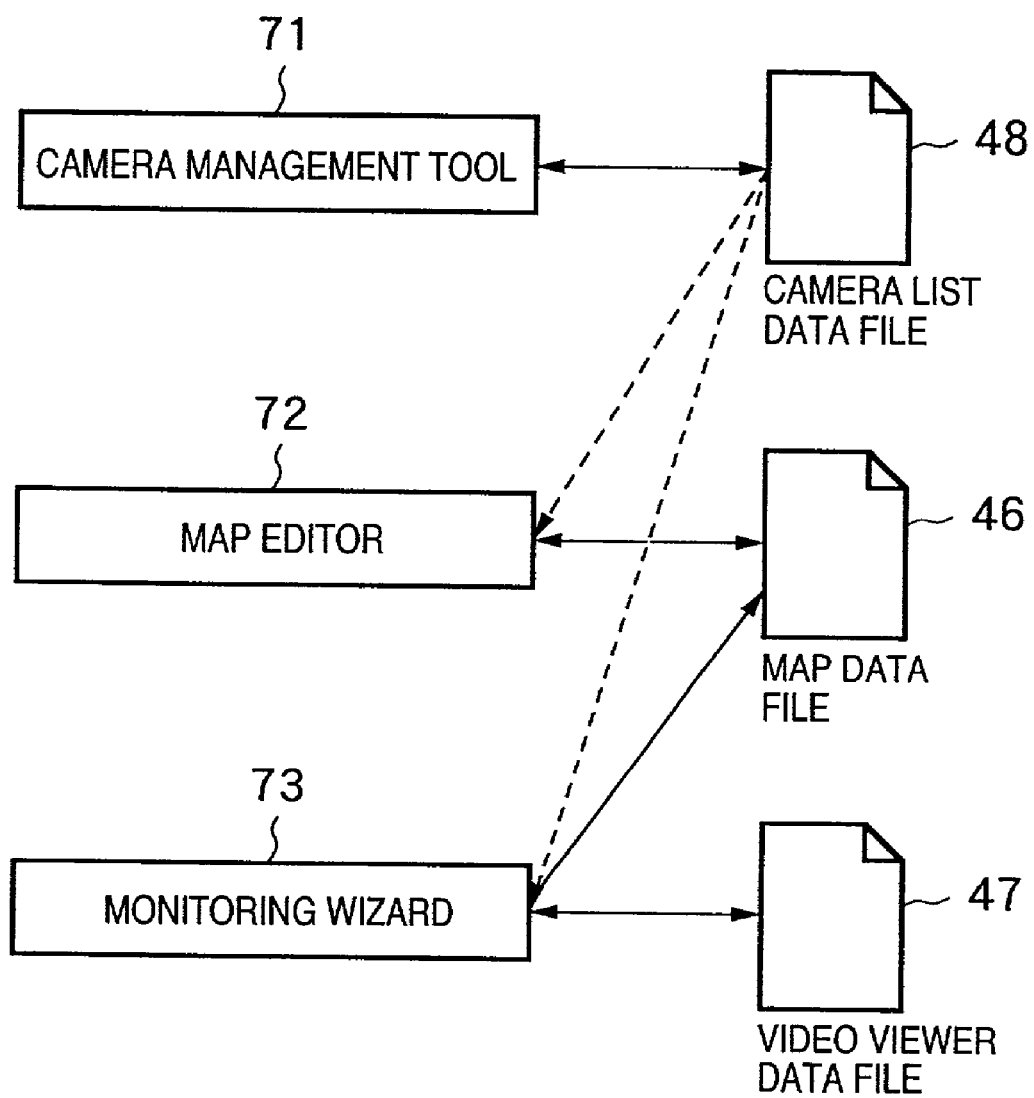
FIG. 7 is a diagram of software programs and data according to the first embodiment of the present invention.

FIG. 7 is a diagram showing software programs and data of the management station 5.

Reference numeral 71 denotes a camera management tool for managing an information list of the names, identification numbers, network addresses (connection information), types, and the like of camera stations connected to the network 3. The camera management tool 71 extracts information on the camera list data file 48, and saves that file in the server 6.

Reference numeral 72 denotes a map editor for editing a camera map. The map editor 72 edits the positions of camera icons, background bitmap, and the like on the map, and extracts information on the edited contents on the map data file 46 and saves that file in the server 6.

Reference numeral 73 denotes a monitoring wizard for automatically configuring the monitoring window by presenting inquiries in turn in a wizard pattern. The monitoring wizard 73 extracts the configuration result on the main data file 45 (FIG. 4) and video viewer data file 47, and saves these files in the server 6.

Figure 8:
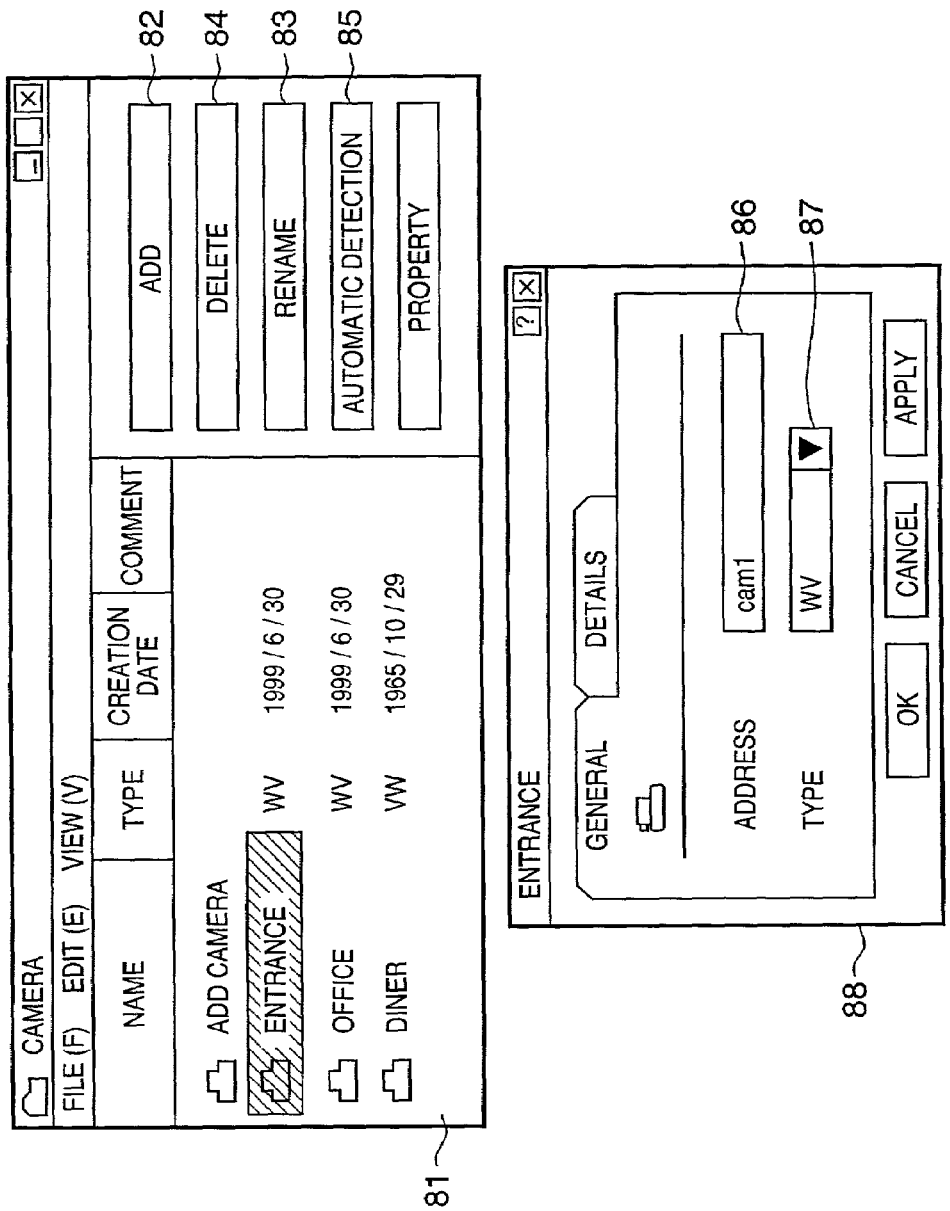
FIG. 8 shows an execution window of a camera management tool according to the first embodiment of the present invention.

FIG. 8 shows an execution window of the camera management tool 71.

Referring to FIG. 8, reference numeral 81 denotes a list display section for displaying a list of information of registered camera stations; 82, an addition button for additionally registering new camera station information; 83, a rename button used to change the name of a camera station; 84, a delete button for deleting the registered camera station information; and 85, an automatic detection button for automatically detecting a camera station connected to the network by a network device automatic detection protocol such as Universal Plug and Play (UPnP) or the like.

When a camera station is automatically detected upon depression of the automatic detection button 85, the camera management tool 71 acquires a device information file in the XML format from that camera station. The camera management tool 71 copies link information to a video viewer style sheet file 44 to be used for that camera station, which is described in the device information file, to the camera list data file 48.

Reference numeral 88 denotes a property dialog used to input camera station information; 86, an address field used to input the network address of the camera station; and 87, a type compo box for designating the type of camera station.

Figure 9:
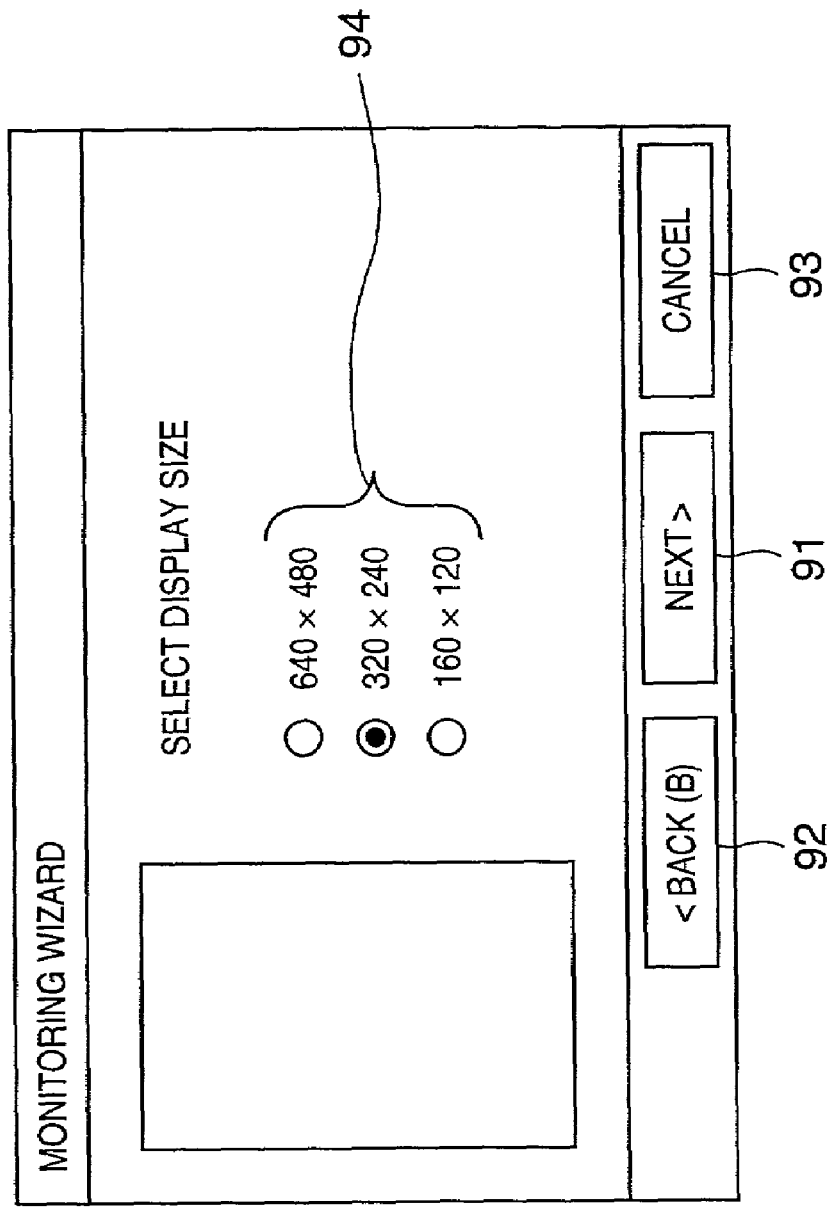
FIG. 9 shows an example of an inquiry window of a monitoring wizard according to the first embodiment of the present invention.

FIG. 9 shows an example of an inquiry window of the monitoring wizard.

Reference numeral 91 denotes a "next" button used to go to the next inquiry; 92, a "back" button used to go back to the immediately preceding inquiry; 93, a cancel button used to cancel the monitoring wizard; and 94, option buttons used to select an answer to the inquiry from some choices.

Figure 10:
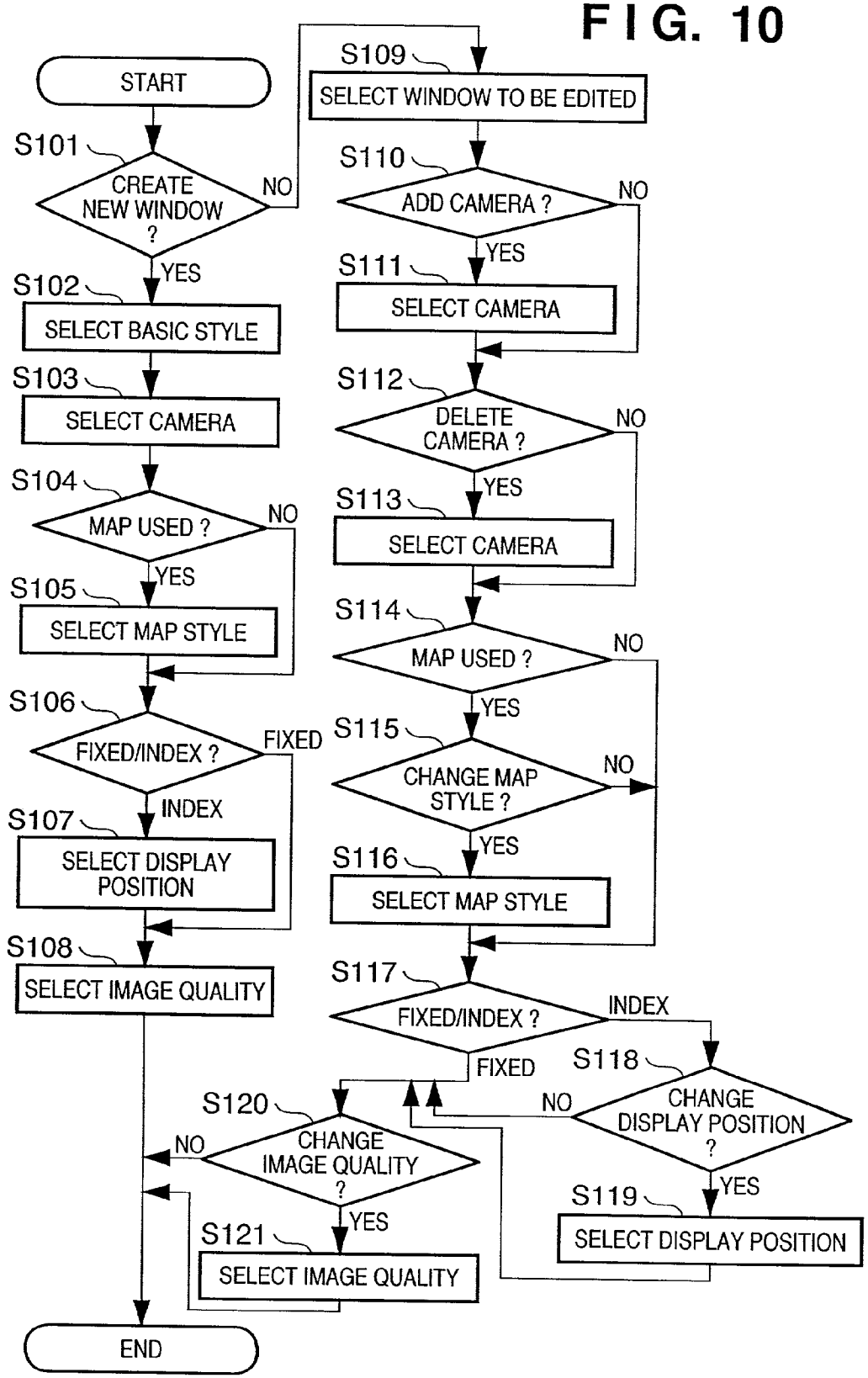
FIG. 10 is a flow chart showing an example of an inquiry flow of the monitoring wizard according to the first embodiment of the present invention.

FIG. 10 is a flow chart showing an example of the inquiry flow of the monitoring wizard.

On the first page of the wizard, it is inquired if a new monitoring window is to be created or the existing window is to be edited (step S101). If the existing window is to be edited, the flow jumps to an existing window edit process in step S109 and subsequent steps. On the other hand, if a new monitoring window is to be created, the basic style of the monitoring window is inquired to obtain the basic style (step S102). A camera to be used of those registered in the camera management tool is inquired to specify the camera to be used (step S103). It is then inquired if the basic style uses a camera map (step S104). If the basic style is of a type which uses a camera map (YES in step S104), the display style of the camera map is inquired to obtain the display style (step S105). Note that this dialog has a button for launching the map editor to edit the camera map. If the camera map is not used (NO in step S104), the flow jumps to step S106.

It is inquired in step S106 if the basic style is of fixed display type or index window type. If the index window type is selected, the display position of the camera is inquired to obtain the display position (step S107). If the fixed display type is selected, since the display position is fixed in position, the flow jumps to step S108. Finally, the image quality and frame rate of an image to be displayed are inquired to obtain the image quality and frame rate (step S108).

If the existing window is to be edited, the window to be edited is selected from the existing windows in step S109. If it is determined that a camera is to be added (YES in step S110), the camera to be added is selected in step S111. If a camera is to be deleted (YES in step S112), the camera to be deleted is selected in step S113. It is checked in step S114 if the style used uses a camera map. If the style uses a camera map, it is confirmed in step S115 if the map style is to be changed. If the map style is to be changed (YES in step S115), the display style of the camera map is inquired in step S116 to obtain the display style. Note this dialog comprises a button for launching the map editor to edit the camera map. It is inquired in step S117 if the style used is of fixed display type or index window type. If the index window type is selected, it is inquired in step S118 if the display position of the camera is to be changed. If the display position of the camera is to be changed, the display position is obtained in step S119. Finally, it is inquired if the image quality and frame rate of an image to be displayed are to be changed, and if they are to be changed, the image quality and frame rate are obtained in step S121.

After the user answers the aforementioned inquiries and presses a finish button, the monitoring wizard 73 generates the main data file 45, video viewer data file 47, and map data file 46 as needed, and saves them in the server 6. At this time, a link to the main style sheet file 42 corresponding to the basic style selected in step S102 is written in the main data file 45 as a style.

FIG. 11 shows an example of choices of basic styles of the monitoring windows to be selected in step S102.

Reference numeral 111 denotes a floor type camera map+video style also shown in FIG. 2; 112, a wide-area type camera map+video style; 113, a camera list+video style; 114, a floor map+4-video fixed display style; 115, a 4-video fixed display style; 116, a 6-video fixed display style; 117, a 1-video full-screen style; and 118, an index window+video style. Note that the present invention is not limited to the styles shown in FIG. 11, and various other styles may be used.

In the first embodiment, the display position, image quality, and frame rate of each camera can be changed. However, the present invention is not limited to such specific embodiment, and various display properties may be selected using different display styles.

As described above, according to the first embodiment of the present invention, since an end user can easily change the window configuration, a window configuration suitable for the purpose intended can be realized with low cost.

Second Embodiment

The second embodiment of the present invention will be explained next.

In the first embodiment, a window is configured using an exclusive software tool for supporting configuration of window stored in the management station 5 and management data stored in the server 6. Whereas, a case where the server 6 stores a software tool is explained in the second embodiment. Specifically, data used for monitoring in the monitoring stations 4 is generated and updated by a management service server 6, and stored in the management service server 6 along with software. In order to more clearly express the difference between the first and second embodiments, the server 6 for storing software tool is called "management service server 6", and the management station 5 which no longer stores software tool is called "management client".

Further, the operation of the monitoring stations 4 are the same as that explained in the first embodiment with reference to FIG. 2 and FIGS. 4 to 7 except that the necessary program and data are read from the management service server 6 instead of the management station. Therefore, the explanation of the operation is omitted here.

Below, the configuration and operation according to the second embodiment are explained mainly for the difference between the first and second embodiments.

A configuration of a remote monitoring system according to the second embodiment is similarly to that shown in FIG. 1; however, a Web server is running on the management service server 6 which provide management service of the monitoring system via a network, such as Internet. The management client 5 accesses to the management service server 6 using a Web browser thereby it is capable to enjoy the provided service. It is unnecessary to install a special software in the management client 5 upon using the provided service, and a general monitoring manager can easily generate a monitoring window and manage the system.

It should be noted that the monitoring station 4 and the management client 5 may be implemented by a single personal computer.

Figure 12:
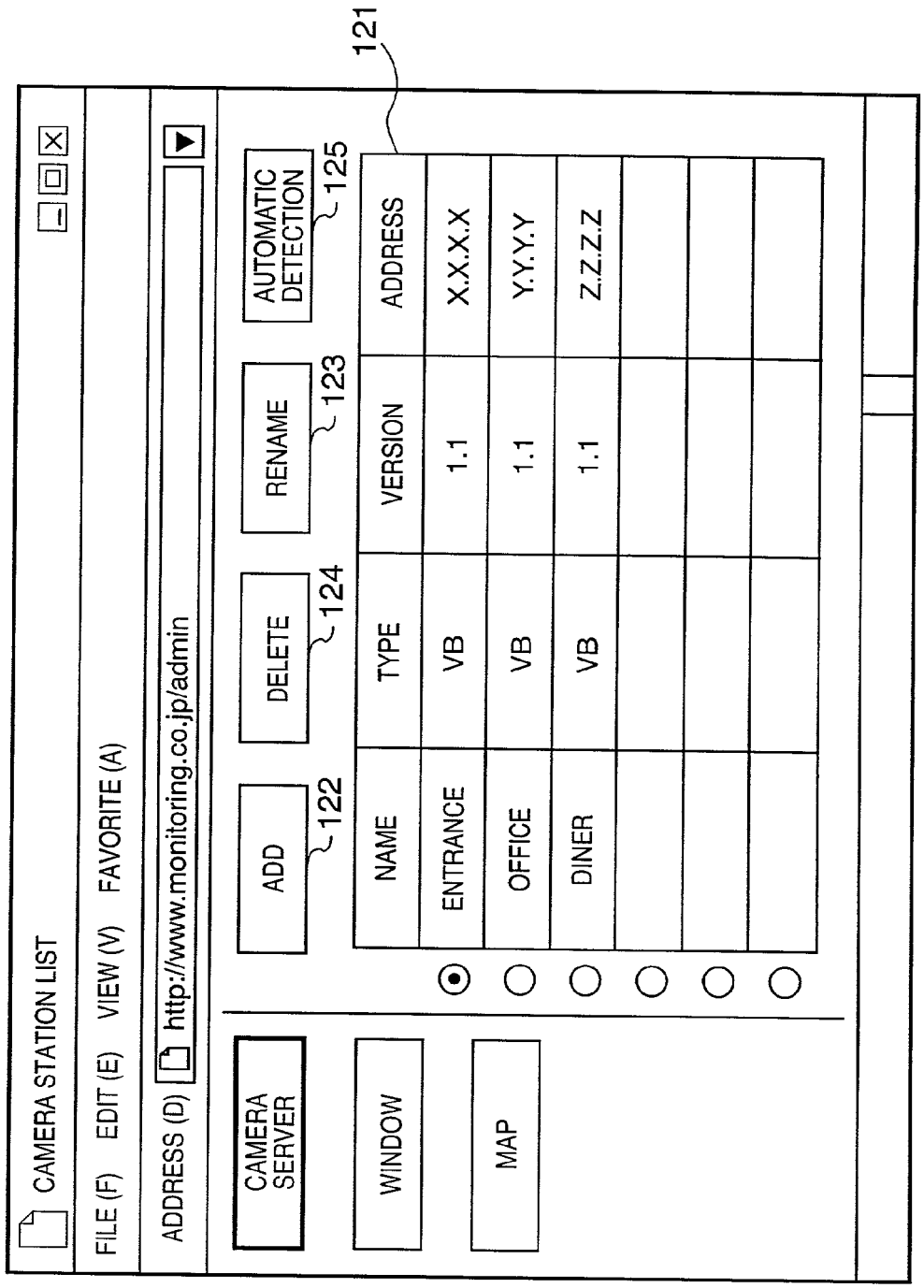
FIG. 12 shows an example of a window when accessing to a camera management tool according to a second embodiment of the present invention.

FIG. 12 shows an example of a window when the management client 5 accesses to the camera management tool 71 using a Web browser.

Referring to FIG. 12, reference numeral 121 denotes a list display section for displaying a list of information of registered camera stations; 122, an addition button for additionally registering new camera station information; 123, a rename button used to change the name of a camera station; 124, a delete button for deleting the registered camera station information; 125, an automatic detection button for automatically detecting a camera station connected to the network by a network device automatic detection protocol such as UPnP or the like. When the addition button 122 is depressed, a window for adding a camera is displayed.

Figure 13:
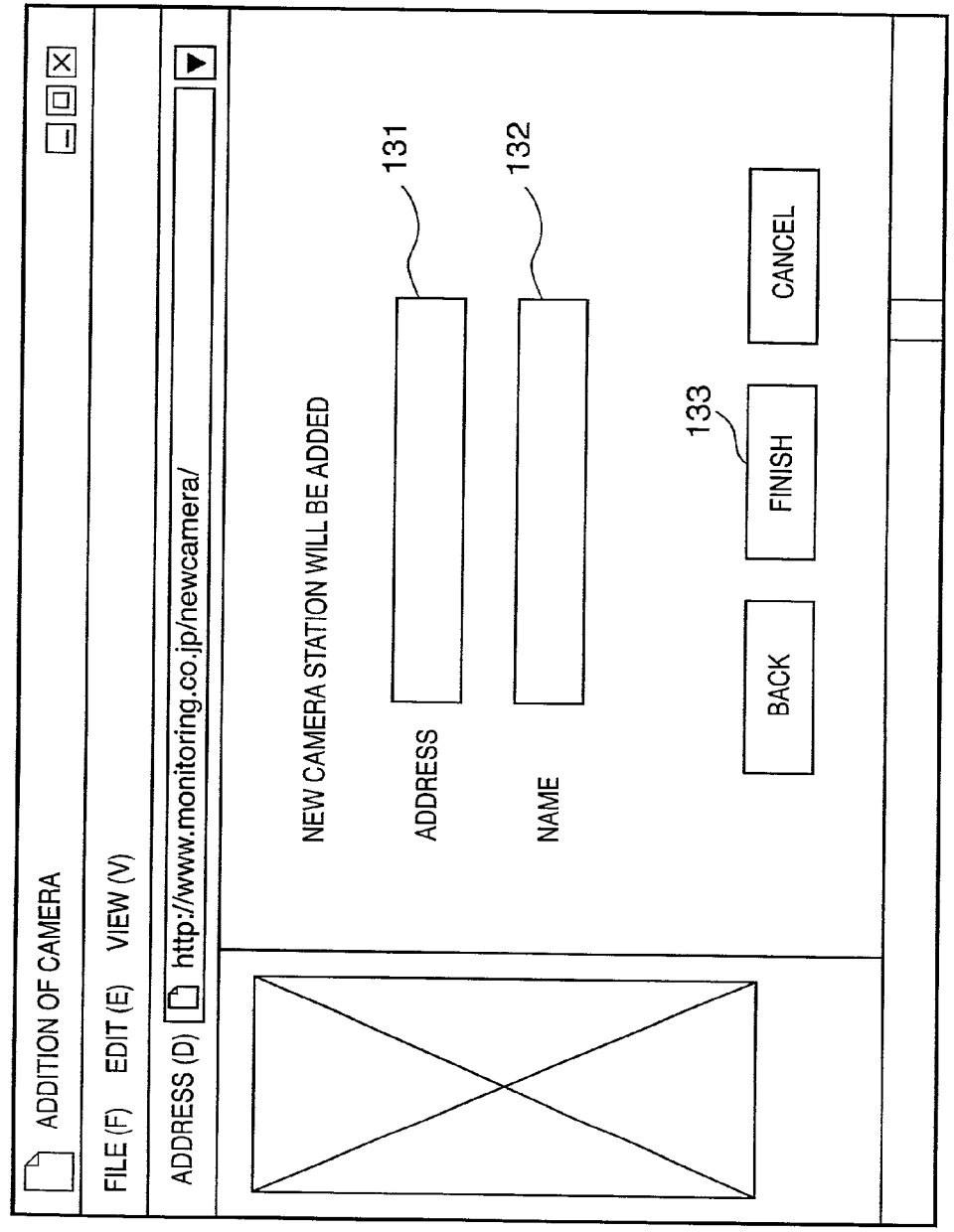
FIG. 13 shows an example of a window for adding a camera according to the second embodiment of the present invention.

FIG. 13 shows an example of a window for adding a camera. Reference numeral 131 denotes an input section for inputting a network address of a camera station; 132, an input section for inputting a name of the camera station; and 133, a finish button for completing input processing. When the finish button 133 is depressed under the state that an appropriate network address and name is inputted, the management client 5 sends the network address and name to the management service server 6. When the management service server 6 receives the information, it adds a new camera in the camera station list.

Further, when the automatic detection button 125 shown in FIG. 12 is depressed, the management client 5 automatically detects camera station or stations in accordance with the script description embedded in a window display program of the camera management tool 71, and acquires a device information file in the XML format. The camera management client 5 then transfers to the device information file to the management service server 6. When the management service server 6 receives the information, it adds a new camera station in the camera list data file 48.

Figure 14:
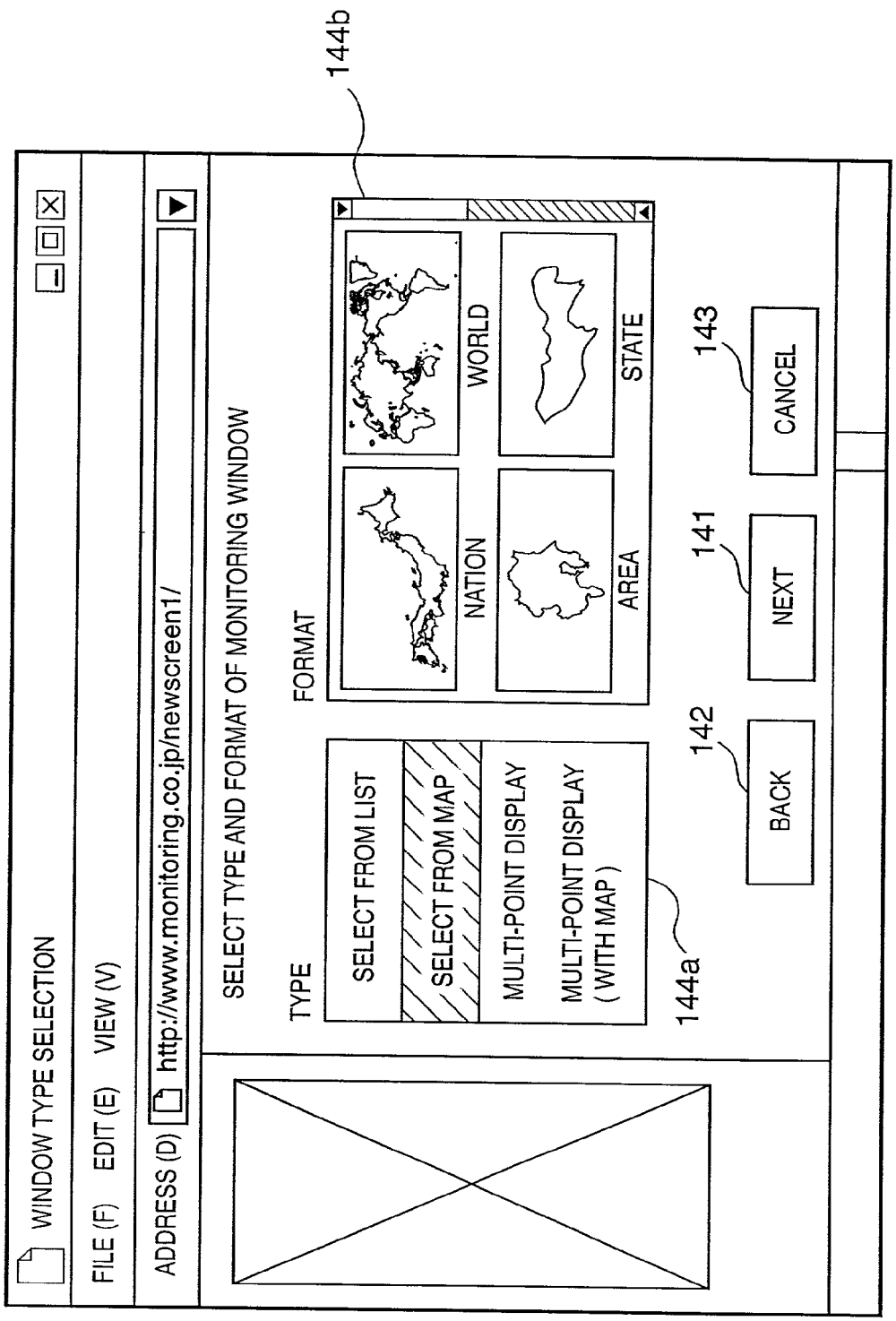
FIG. 14 shows an example of a window of a monitoring wizard according to the second embodiment of the present invention.

FIG. 14 shows an example of a window when the management client 5 accesses to the monitoring wizard 73 (FIG. 7) using a Web browser. Reference numeral 141 is a "next" button used to go to the next inquiry; 142, a "back" button used to go back to the immediately preceding inquiry; and 143, a cancel button used to cancel the monitoring wizard. Reference numerals 144a and 144b denote lists of monitoring window types and formats, respectively, for a user to select one from each list.

FIG. 15 is a flow chart showing an example of an operation of the monitoring wizard 73. First, the management client 5 accesses to the first window (displaying a window type list) of the monitoring wizard, and requests the window (step S201). The management service server 6 sends a window of lists of monitoring window types and formats in response to the request (step S202). The management client 5 receives the lists and display them (step S203).

Next, the management client 5 sends ID indicating the type of window selected by the user to the management service server 6 (step S204). The management service server 6 receives the sent ID (step S205) and sends a list of camera stations (step S206).

The management client 5 receives and display the list of camera stations (step S207). Thereafter, the management client 5 sends ID indicating a camera station selected by the user to the management service server 6 (step S208). The management service server 6 receives the ID of the camera station (step S209), generates the main data file 45, video viewer data file 47, and map data file 46 as needed based on the ID of the monitor type and ID of the camera station, and stores these files (step S210). At this time, a link to the main style sheet file 42 corresponding to the basic style selected in step S202 is written to the main data file 43 as style designation.

The monitoring window generated as above can be checked anytime on a window of monitoring window list from the management client 5 or the monitoring stations 4 by accessing to the management service server 6.

FIG. 16 shows an example of a window showing a monitoring window list. When the management client 5 or monitoring station 4 accesses to the monitoring window list, the management service server 6 sends the list, and the management client 5 or monitoring station 4 displays the list. Reference numeral 160 denotes a monitoring window list; 161, a generation button for launching a monitoring wizard for generating a new monitoring window; 162, a delete button for deleting an existing monitoring window; 163, a display button for displaying and utilizing a monitoring window; and 164, an edit button for editing an existing monitoring window.

When the display button 163 is depressed, the management client 5 or monitoring station 4 sends ID of the selected monitoring window to the management service server 6, thereby requests the monitoring window. The management service server 6 receives the ID and sends the main data file 45 corresponding to the requested monitoring window to the management client 5 or monitoring station 4. The management client 5 or monitoring station 4 receives the file, generates, displays, and executes the monitoring window as described with reference to the flow chart shown in FIGS. 5 and 6. It should be noted that the monitoring window may be reselected in response to an instruction from the management client 5 or monitoring station 4.

According to the second embodiment as described above, similarly to the first embodiment, when, e.g., a style sheet file is replaced by another one, the display syle of the monitoring window can be changed. Also, by changing data files, the monitoring window having a given display style can be generated for different camera layouts and arrangements.

In the second embodiment, the management client 5 generates a monitoring window. However, it is possible to configure the monitoring stations 4 so as to be capable of generating monitoring window.

Further, in order to give authorization for generating, editing, and deleting monitoring windows to a specific client (in the second embodiment, the management client 5), the management client to which the authorization is to be given may be registered in the management service server 6 in advance, clients connecting to the management service server 6 may be classified by password, or other known methods may be used.

As described above, according to the second embodiment of the present invention, an end user can easily generate a video display window suitable for the purpose intended without installing a specific software tool with low cost.

Other Embodiment

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIGS. 5 and 6, and/or 10 or 15 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image display apparatus for selecting an arbitrary image sensing device from one or more image sensing devices connected, and displaying a video obtained from the selected image sensing device, comprising:
   first memory for holding management data which contains at least a name, identification number, and connection information of each image sensing device, and is described in a data description language;
   second memory for holding a display style of the management data, which is described in a style designation language; and
   data description means for describing management data in the data description language, and storing the data in said first memory.

2. The apparatus according to claim 1, further comprising:
   means for reading out the management data from said first memory;
   means for reading out the display style from said second memory; and
   a data display unit for displaying by applying the readout management data to the readout display style.

3. The apparatus according to claim 2, further comprising:
   selection means for selecting an arbitrary image sensing device from the image sensing devices; and
   image composition unit for composing and displaying a video obtained by the image sensing device selected by said selection unit together with the display contents of said data display unit.

4. The apparatus according to claim 1, wherein a function of the image sensing device includes at least one of a pan angle, tilt angle, zoom ratio, and image quality, and can be controlled, and the display style of the management data includes a style of an operation display for controlling the function.

5. The apparatus according to claim 1, wherein the display style of the management data includes a map display indicating a layout of the image sensing devices.

6. The apparatus according to claim 1, wherein the image sensing devices and said image display apparatus are connected via a network.

7. The apparatus according to claim 1, wherein said data description language is XML (eXtensible Markup Language).

8. The apparatus according to claim 1, wherein said style description language is XSL (eXtensible Stylesheet Language).

9. An image display system comprising:
one or more image sensing devices;
first memory for holding management data which contains at least a name, identification number, and connection number of each image sensing device, and is described in a data description language;
second memory for holding a display style of the management data, which is described in a style designation language;
data description means for describing management data in the data description language, and storing the data in said first memory;
means for reading out the management data from said first memory;
means for reading out the display style from said second memory; and
a data display unit for displaying by applying the readout management data to the readout display style.

10. The system according to claim 9, further comprising:
selection means for selecting an arbitrary image sensing device from the image sensing devices; and
image composition means for compositing and displaying a video obtained by the image sensing device selected by said selection means together with the display contents of said data display unit.

11. The system according to claim 9, wherein a function of the image sensing device includes at least one of a pan angle, tilt angle, zoom ratio, and image quality, and can be controlled; and
the display style of the management data includes a style of an operation display for controlling the function.

12. The system according to claim 9, wherein the display style of the management data includes a map display indicating a layout of the image sensing devices.

13. The system according to claim 9, wherein the image sensing devices are connected via a network.

14. The system according to claim 9, wherein said data description language is XML (eXtensible Markup Language).

15. The method according to claim 9, wherein said style description language is XSL (eXtensible Stylesheet Language).

16. An image display method in an image display system for displaying a video obtained from an arbitrary image sensing device of one or more image sensing devices connected, having first memory for holding management data which contains at least a name, identification number, and connection number of each image sensing device, and is described in a data description language, second memory for holding a display style of the management data, which is described in a style designation language, and a data display unit, comprising:
the first read-out step of reading out the management data of an image sensing device from said first memory;
the second read-out step of reading out the display style of the management data from said second memory; and
the display step of displaying by applying the management data to the display style.

17. The method according to claim 16, further comprising:
the selection step of selecting an arbitrary image sensing device from the image sensing devices; and
the image composition step of composing and displaying a video obtained by the selected image sensing device together with the display contents at the display step.

18. The method according to claim 16, further comprising the data description step of describing management data in the data description language, and storing the data in the first memory.

19. The method according to claim 16, wherein the display step includes the step of compositing and displaying a video obtained from the selected image sensing device.

20. The method according to claim 16, wherein a function of the image sensing device includes at least one of a pan angle, tilt angle, zoom ratio, and image quality, and can be controlled, and
the display style of the management data includes a style of an operation display for controlling the function.

21. The method according to claim 16, wherein the display style of the management data includes a map display indicating a layout of the image sensing devices.

22. The method according to claim 16, wherein the image sensing devices and the data display unit are connected via a network.

23. The method according to claim 16, wherein said data description language is XML (eXtensible Markup Language).

24. The apparatus according to claim 16, wherein said style description language is XSL (eXtensible Stylesheet Language).

25. A computer program product comprising a computer usable medium having computer readable program code means embodied in said medium for an image display method in an image display system for displaying a video obtained from an arbitrary image sensing device of one or mare image sensing devices connected, having first memory for holding management data which contains at least a name, identification number, and connection number of each image sensing device, and is described in a data description language, second memory for holding a display style of the management data, which is described in a style designation language, and a data display unit, said product including:
first computer readable program code means for reading out the management data of an image sensing device from said first memory;
second computer readable program code means for reading out the display style of the management data from said second memory; and
third computer readable program code means for displaying by applying the management data to the display style.

* * * * *